United States Patent [19]

Lutz

[11] 4,180,719
[45] Dec. 25, 1979

[54] TUNGSTEN CARBIDE IMPREGNATOR

[76] Inventor: Kenneth V. Lutz, P.O. Box 1467, Roseville, Calif. 95678

[21] Appl. No.: 859,797

[22] Filed: Dec. 12, 1977

[51] Int. Cl.² .................... B23K 9/30; F16H 35/08
[52] U.S. Cl. ....................... 219/125.12; 74/600; 228/28
[58] Field of Search .............. 219/125.12, 76.1; 74/395, 22 A, 22 R, 23, 24, 835, 836, 837, 600; 228/27, 28

[56] References Cited

U.S. PATENT DOCUMENTS

| 771,928 | 10/1904 | Persson | 74/600 |
|---|---|---|---|
| 1,956,406 | 4/1934 | Vars | 219/125.12 |
| 2,855,521 | 10/1958 | Blackstone | 74/600 X |
| 3,359,825 | 12/1967 | Wiig | 74/600 |
| 3,571,557 | 3/1971 | Valentine | 219/125.12 |
| 3,611,836 | 10/1971 | Weck | 74/600 X |
| 3,619,552 | 11/1971 | Cape | 219/124.32 |
| 3,621,183 | 11/1971 | Chambonnet | 219/124.32 |
| 3,681,564 | 8/1972 | Hiyama et al. | 219/125.12 |
| 3,832,522 | 8/1974 | Arikawa et al. | 219/125.12 |
| 3,845,271 | 10/1974 | Hirano et al. | 219/125.12 |

FOREIGN PATENT DOCUMENTS 12960 of 1850 United Kingdom ............... 74/836

Primary Examiner—Bruce A. Reynolds
Assistant Examiner—Keith E. George
Attorney, Agent, or Firm—Jack M. Wiseman

[57] ABSTRACT

A welding head oscillating mechanism for a welding machine which is selectively operable to alter the width of the weld bead or area by selectively rotating an adjustment shaft about its axis to change the stroke of a crank and slide mechanism.

9 Claims, 9 Drawing Figures

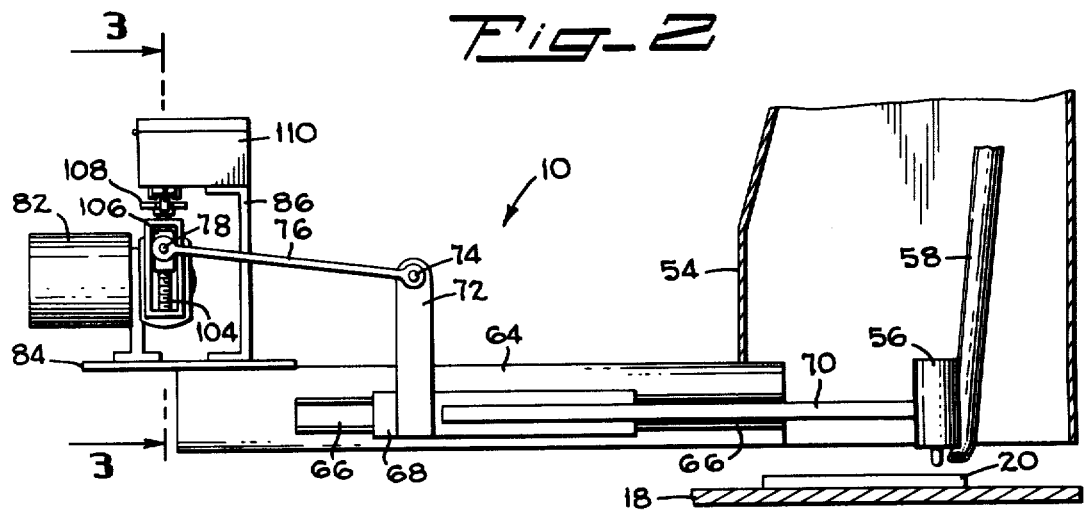
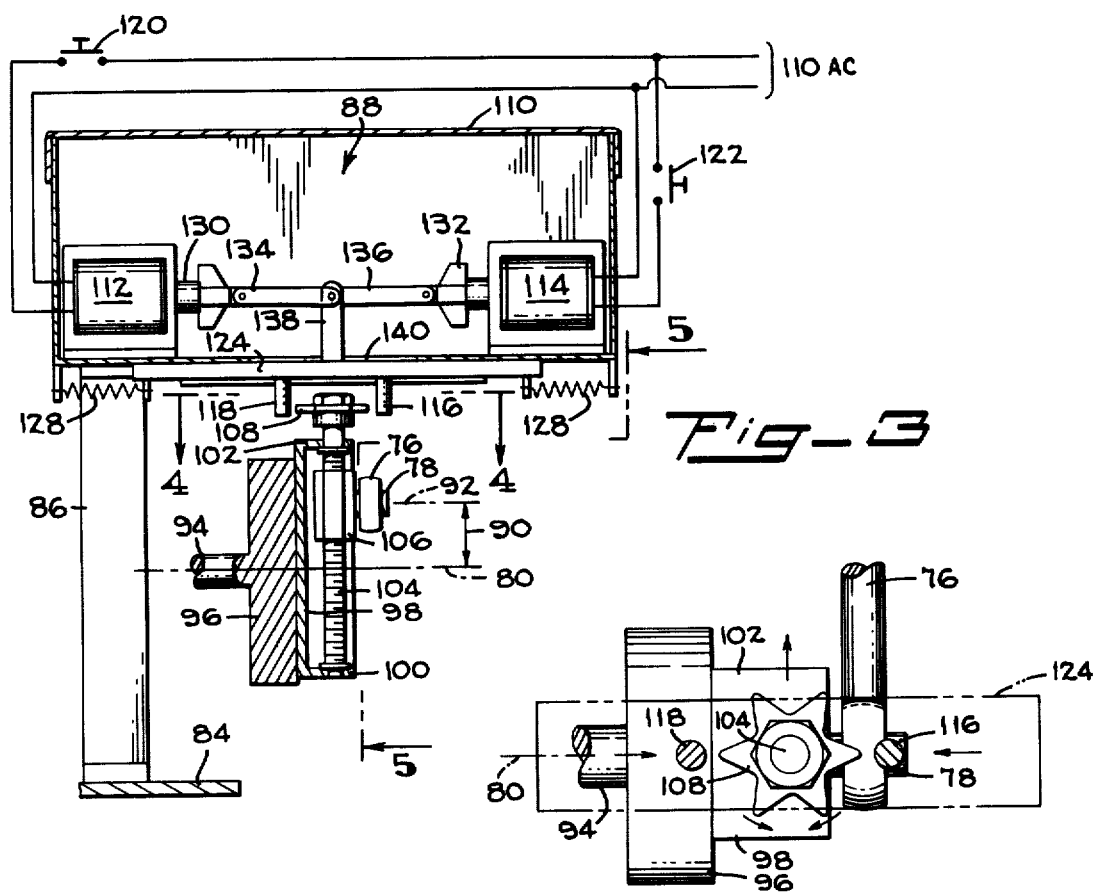

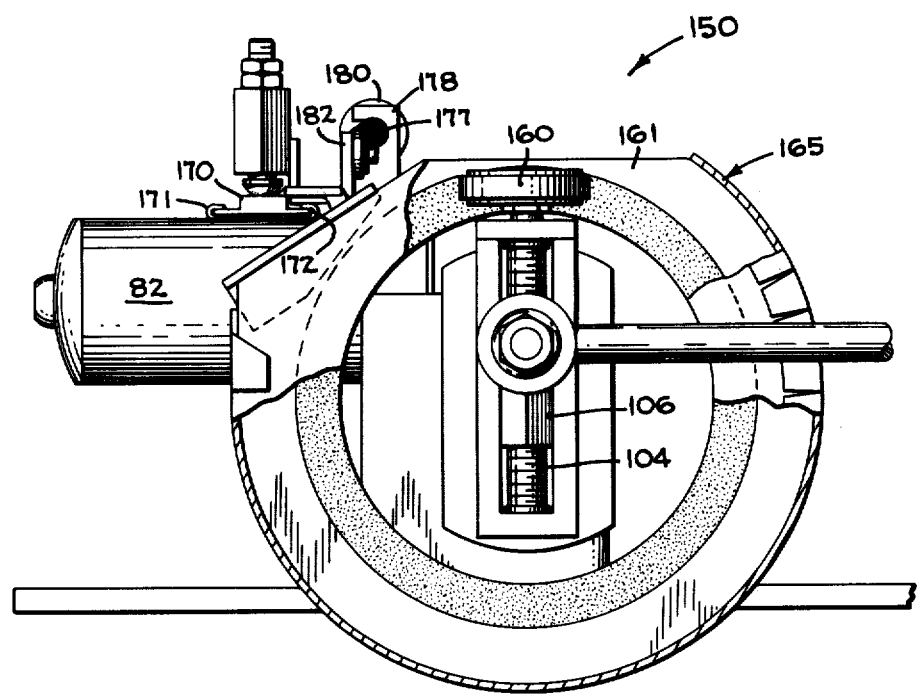

4,180,719

TUNGSTEN CARBIDE IMPREGNATOR

BACKGROUND OF THE INVENTION

1. Field of the Invention

This invention relates in general to automated arc welding systems, and more particularly to automated arc welding systems wherein an oscillating movement is imparted to the welding electrode during the welding operation.

2. Description of the Prior Art

Welding systems heretofore provided control of penetration, fusion, and other welding parameters by oscillating the welding torch or electrode head. In some cases, the speed of oscillations is varied, and/or the welding current is increased and decreased, for providing an optimum welding bead. In some instances, the prior art welding head oscillating mechanism is adjustable to vary the amplitude of oscillation during the welding operation.

The U.S. Pat. to Valentine No. 3,571,557 discloses a welding torch guided by a linearly movable slide. A rocking link with a slotted body is pivoted to the slide and a slotted portion of the link is engaged by a movable fulcrum nut. The fulcrum nut is threaded on an adjustment shaft which may be manually turned by a handwheel, thus moving the fulcrum nut along the rocking link to change the amplitude of oscillation of the slide, and of the welding torch attached thereto. The device disclosed in the patent to Valentine is not remotely operable, and due to its proximity to the weld area is not considered to be, as a practical arrangement, adjustable in operation when welding currents in the order of 1,000 amperes are employed, as in the present instance.

In the U.S. Pat. to Hirano, No. 3,845,271, there is disclosed an oscillating type automatic arc welding apparatus in which the drive motor shaft axis is perpendicular to the reciprocating connecting rod. The patent to Hirano teaches adjusting the stroke of the connecting rod by altering the discs between the central axis of the drive motor shaft and the main shaft. The main shaft has an eccentric movement.

The U.S. Pat. to Arikawa et al. No. 3,832,522 discloses a welding process and apparatus in which a rotary disc imparts a reciprocating motion to the torch tip. A timing motor controls the rotation angle of the rotary disc to regulate the amplitude of the oscillating movement of the torch tip. The U.S. Pat. to Cape, No. 3,619,552 discloses an oscillating welding electrode for an automatic welding machine in which adjustable abutment surfaces on opposite sides of a headed screw limit the amplitude of the oscillatory movement of the welding gun.

In the prior art patents, it appears that the welding head moves over an arcuate path and thus, the weld bead assumes an arcuate configuration. A welding head travelling over an arcuate path requires higher welding currents than a welding head travelling over a rectilinear path.

Other U.S. patents of interest are:
No. 3,621,183
No. 3,681,564

Apparatus of the general description of the present invention has been manufactured and sold by Arcair of Lancaster, Ohio.

SUMMARY OF THE INVENTION

A welding machine wherein a rotatable adjustment shaft is mounted in a carrier for rotation about its axis, for rotation about a drive axis perpendicular to its axis and against displacement in the axial direction. The adjustment shaft carries a connector which is pivoted to a drive link that moves the welding head and which is movable along the axis of the adjustment shaft in response to rotation of the adjustment shaft about its axis. Fixed to the adjustment shaft is a cylindrical means concentric with the adjustment shaft than can be selectively rotated to turn the adjustment shaft about its axis to vary the location of the connector along the axis of the adjustment shaft.

By virtue of this arrangement, the movement of the connector along the axis of the adjustment shaft alters the radial distance between the drive axis and the drive link pivot axis of the connector. The change of the eccentricity of the drive link relative to the drive axis changes the stroke of the drive link and the welding head which is moved by the drive link.

A feature of the present invention is that the simple and effective type of welding head adjustment is provided. Another feature of the present invention is that the weld bead is planar and has even bead characteristics along the weld. A welding head travelling over a planar path in a reciprocal movement requires less welding currents than a welding head travelling over an arcuate path.

BRIEF DESCRIPTION OF THE DRAWINGS

FIG. 2 is a diagrammatic elevation, partly in section, of the adjustable welding head oscillating mechanism and is viewed in the direction of the arrows 2 on FIG. 1.

FIG. 3 is an enlarged diagrammatic section taken along lines 3—3 on FIG. 2.

FIG. 4 is an enlarged diagrammatic section taken along lines 4—4 on FIG. 3.

FIG. 9 is a diagrammatic side elevation view of the adjustable welding head oscillating mechanism shown in FIGS. 7 and 8 with portions thereof broken away.

DESCRIPTION OF THE PREFERRED EMBODIMENT

Figure 1:
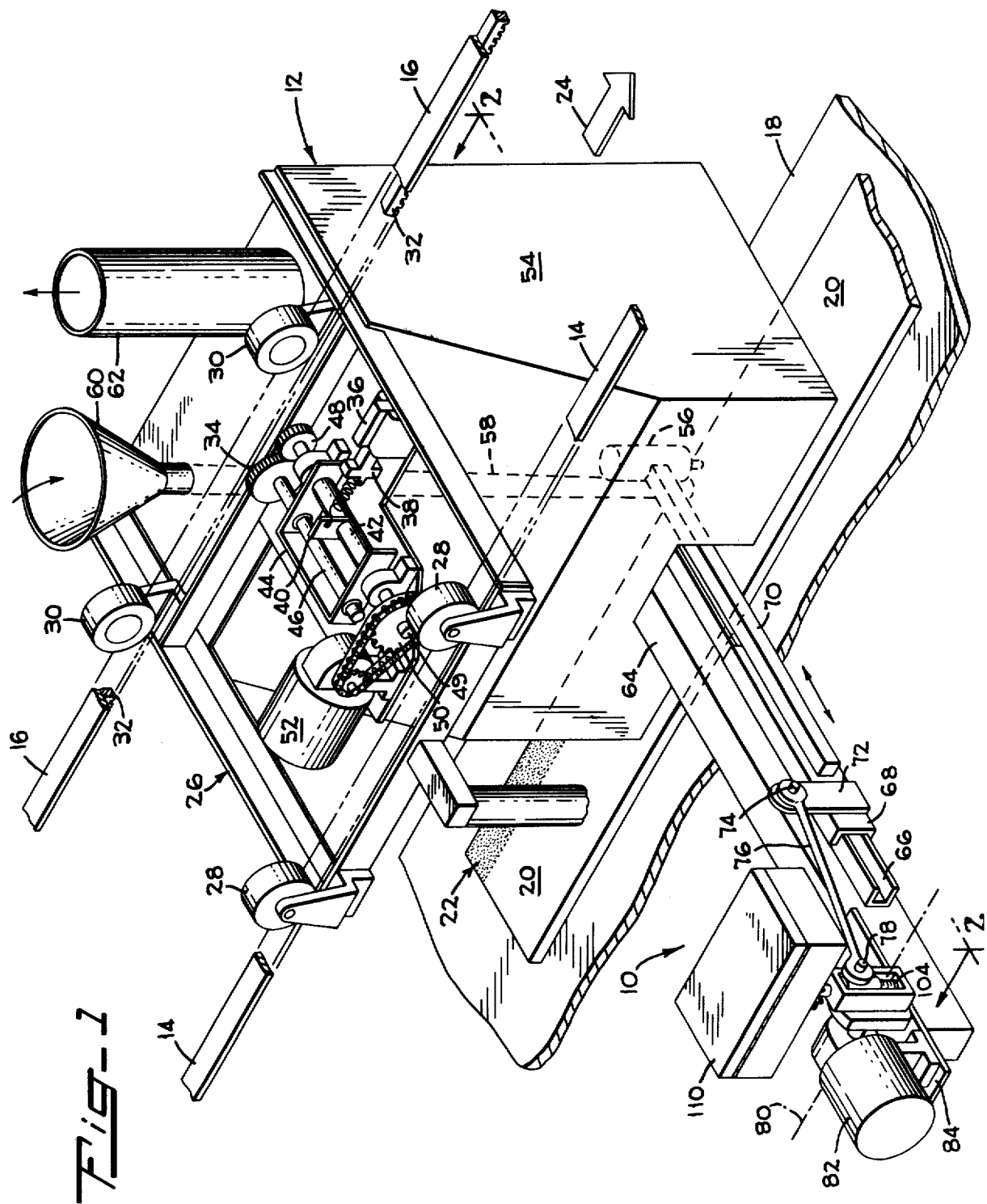
FIG. 1 is a diagrammatic isometric view of a dynamic welding machine incorporating the adjustable welding head oscillating mechanism of the present invention.

Illustrated in FIG. 1 is the adjustable welding head oscillating mechanism 10 of the present invention which is adapted to be embodied in a dynamic welding machine 12. The latter is of known construction and operating mode, and includes fixed suspension tracks 14 and 16 which ordinarily depend from overhead support structure, not shown, over a coextensive table surface 18.

Briefly, the purpose of the welding machine 12 is to impregnate one longitudinal edge portion of a static workpiece 20 with tungsten carbide grits, shown at 22, as the welding machine moves over the workpiece 20 in the direction of the arrow 24. Abrasion resistance of the workpiece is substantially improved by the addition of the tungsten carbide, and the workpiece is later incorporated in such items as scraper blades and loader buckets with the abrasion-resistant edge being the cutting edge.

In order to support the welding machine 12 for rolling movement along the tracks 14 and 16, the machine 12 includes an upper frame or carriage 26 affixed to pairs of rollers 28 and 30 that respectively ride along the tracks 14 and 16. For positively driving the machine, the track 16 carries a depending fixed rack 32 which is selectively engaged by a pinion gear 34 with the rack 32, a solenoid 36 is arranged to elevate the gear. Thus, the solenoid armature 38 is coupled via a spring to a lever 40 that is secured to a sleeve 42. Sleeve 42 is integral with a U-shaped frame 44, the closed end of which rotatably supports an axle 46 that carries the pinion gear. The pinion gear 34 is in constant mesh with a drive gear 48. The axle 49 for the gear 48 extends through the sleeve 42 and is connected by a chain and sprocket drive train 50 to a variable speed gear head motor 52. With this arrangement, the pinion gear 34 is constantly driven, but only engages the rack 32 to move the welding machine 12 along the tracks 14 and 16 when the solenoid 36 pivots the frame 44 upward about the axis of the driven axle 49.

Depending from the carriage 26 is an enclosure 54 which conceals a carbon arc welding head 56 that may operate at a current in the order of 1,000 amperes, and consequently generates substantial heat and potentially dangerous ultra violet rays. Both of these conditions preclude prolonged close exposure. Mounted alongside the welding head 56 and movable therewith is a conduit 58, fed from a hopper 60 and an associated conveyor mechanism, not shown. Tungsten carbide grits are fed into the hopper 60 at a controlled rate to drop into the molten area of the workpiece adjacent the welding head, and thereby become bonded thereto. Part of the welding head is exhausted through an overhead duct 62.

As previously indicated, the welding operation is carried out with the welding head 56 oscillating across the workpiece 20, the amplitude of such oscillations being the width of the weld area. As also indicated, the purpose of the adjustable welding head oscillating mechanism 10 is to remotely adjust the travel distance of the welding head, while the welding machine 12 is in operation, so as to increase or decrease the width of the weld area. The range of adjustment may typically be up to about three inches, and in increments as small as one-sixty fourth of an inch.

Laterally projecting from one side of the housing 54 (FIGS. 1 and 2) is a beam 64 carrying a guide channel 66. Slidably mounted on and nested over the guide channel 66 is a slide 68 which carries an arm 70 that supports the welding head 56. Not shown in the drawings are means for flooding the weld area around the welding head with an inert gas. Slide 68 is provided with an integral upstanding drive lever 72 pivoted at 74 to a crank arm 76. The crank arm 76 is pivoted at its other end to a stub shaft 78. The stub shaft 78 is moved in an eccentric path about the axis 80 of the output shaft of a gearhead drive motor 82, mounted to a bracket 84 on the free end of the beam 64. An adjacent bracket 86 (FIG. 2) supports a later described remotely operated solenoid actuated trip lever mechanism 88 (FIG. 3), by means of which the radial dimension 90 between the motor shaft axis 80 and the axis 92 of the stub shaft 78 can be changed while the welding head 56 (FIG. 2) is being oscillated.

FIGS. 3 and 4 include a portion of the output shaft 94 of the motor 82, and a mounting plate 96 secured thereto. Affixed to the mounting plate 96 is an open framework carrier 98 having opposed walls 100 and 102. Non-threaded end portions of a threaded adjustment shaft 104 are rotatably mounted in said opposed walls, the shaft being held captive therebetween and carrying a threaded drive nut or connector 106. The previously mentioned stub shaft 78 projects laterally from the connector 106 and is connected to the adjacent end of the crank arm 76. As also shown in FIGS. 3 and 4, one end of the threaded adjustment shaft 104 has secured thereto a star wheel or cylindrical body 108 with radial projections for incrementally turning the shaft 104.

The mounting plate 96, the carrier 98, the adjustment shaft 104, the connector 106, and the star wheel 108 rotate in unison as a unitary structure with the motor shaft 94. However, the obvious imbalance of the assembly is of no consequence because the speed of rotation is extremely low.

The trip lever mechanism 88 (FIG. 3) includes a protective enclosure 110 housing a stroke increase solenoid 112 and a stroke decrease solenoid 114, the solenoids being respectively associated with a stroke increase striker pin or projection engaging member 116 and a stroke decrease striker pin or projection engaging member 118. Actuation of either solenoid by a pushbutton switch 120 or 122 will position the associated striker pin in a position to intercept a projection of the star wheel 108.

Figure 5:
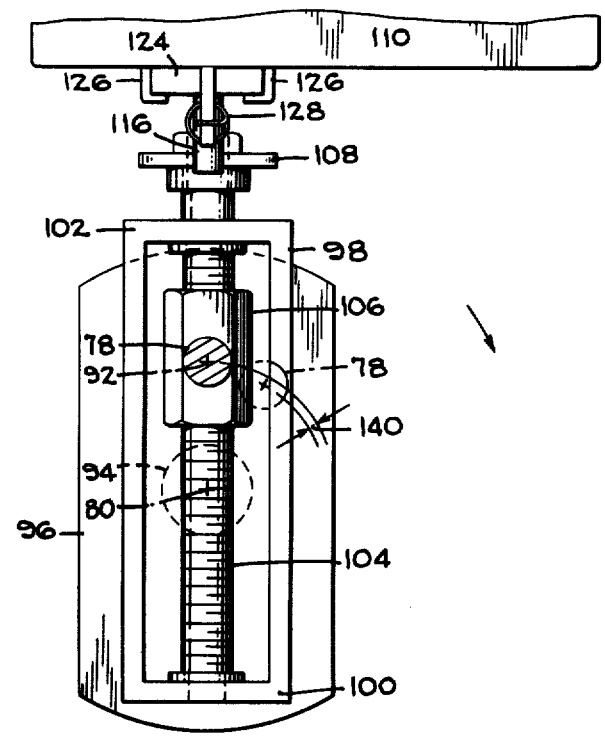
FIG. 5 is a diagrammatic elevation indicated by the arrows 5—5 on FIG. 3.

In the event of neither solenoid being energized, the striker pins 116 and 118 (FIG. 4) lie clear of the projections of the star wheel 108. Thus, the striker pins depend from a freely slidable pin mounting plate 124 which is guided by tracks 126 (FIG. 5) under the enclosure 110, and the pin mounting plate is biased endwise by two light springs 128 so that the plate centers the pins 116 and 118 relative to the star wheel 108.

In order to shift the pin mounting plate 124 (FIG. 3) and engage a pin 116 or 118 with the star wheel 108, the armature 130 and 132, respectively, of the solenoids 112 and 114 are coupled by links 134, 136 to a central upstanding arm 138 of the pin mounting plate, said arm extending through a slot 140 in the bottom wall of the housing 110.

Figure 6:
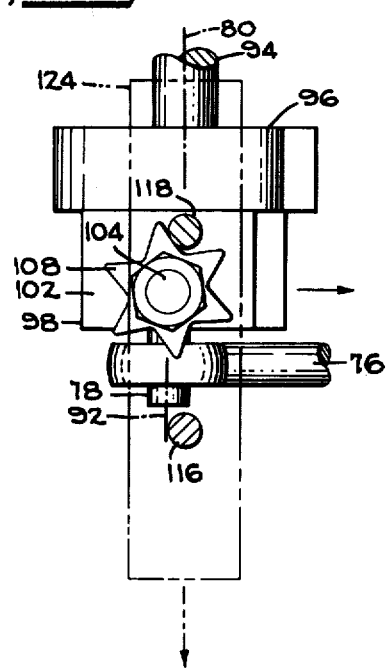
FIG. 6 is a diagrammatic section plan similar to FIG. 4.

Assuming that the threaded adjustment shaft 104 (FIGS. 5 and 6) is provided with right-hand threads, energization of the stroke decrease solenoid 14 (FIG. 3) by manually closing the pushbutton switch 122 draws in the solenoid armature 132. Thus, the link 136 reacts on the arm 138 to shift the pin mounting plate 124 to the right as viewed in FIG. 3, thereby placing the abutment pin 118 (see also FIG. 6) in the path of the star wheel 108. The net effect is that as long as the pushbutton switch 122 is held closed, each time the star wheel moves past the abutment pin 118, one of the projections thereof is struck by the abutment pin 118 and the adjustment shaft 104 turns one-sixth of a revolution counterclockwise as viewed in FIG. 6.

Accordingly, the connector 106 (FIG. 5) moves downward toward the axis 80 of the motor output shaft.

If the adjustment shaft 104 has ten threads per inch, each time the star wheel is incrementally turned, the radial dimension at 140 (FIG. 5) decreases by about one-sixty fourth of an inch. Obviously, a coarser thread on the adjustment shaft will effect a greater stroke decrease, or a greater stroke increase which is carried out in the apparent manner by energizing the stroke increase solenoid 112. If the stroke decrease pushbutton 122 is depressed for a sufficient time, the connector 106 will carry the pivot shaft 78 to a zero stroke position aligned with the motor axis 80, and then the stroke will increase as the drive nut moves away from axis 80; it is thus apparent that the stroke increase and decrease functions attributed to the solenoids 112 and 114 and their pushbuttons 120 and 122, are only true if the drive nut 106 does not travel across the motor shaft axis.

When a desired width of the weld bead or area is achieved, the actuated pushbutton is released and both solenoids 112 and 114 are deenergized. Hence, the striker pins 116 and 118 are removed from the path of travel of the star wheel 108. The weld bead or area will then be formed by the dynamic welding machine 12 on a suitable workpiece with the selected width for a weld bead or area. The weld bead is planar and has an even bead characteristic along the weld. A welding head travelling on a planar path in a reciprocal movement requires less welding currents than a welding head travelling over an arcuate path.

Figure 7:
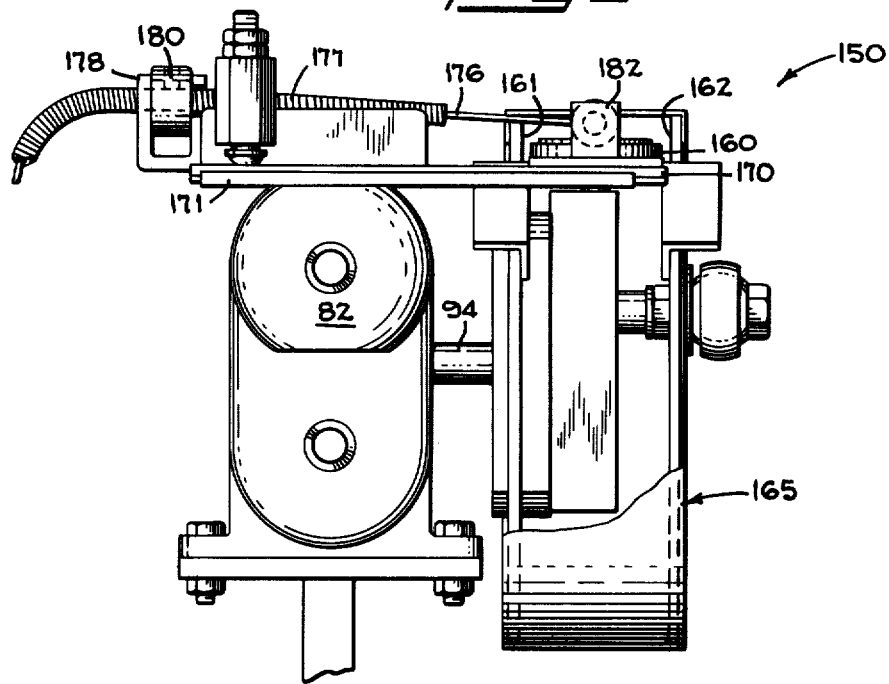
FIG. 7 is a diagrammatic end elevation view with portions thereof broken away of a modification of the adjustable welding head oscillating mechanism shown in FIGS. 1-6.
Figure 8:
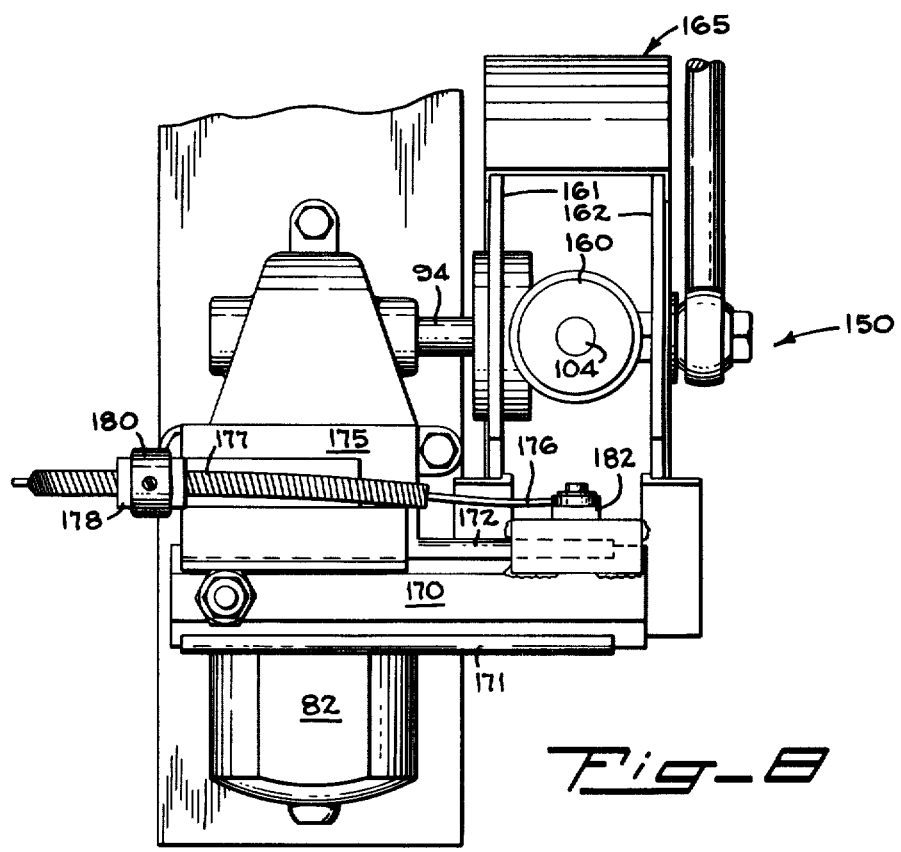
FIG. 8 is a diagrammatic plan view of the adjustable welding head oscillating mechanism shown in FIG. 7.

Illustrated in FIGS. 7 and 8 is an adjustable welding head oscillating unit 150, which is a modification of the adjustable welding head oscillating mechanism of FIGS. 1-6 in that it employs a wheel 160 in lieu of the star wheel 108. The wheel 160 is fixed to the adjustment shaft 104 to impart rotation thereto in a manner similar to the rotation imparted thereto by the star wheel 108. The rim of the wheel 160, in the exemplary embodiment is formed of a rubber or plastic material. The axis of the wheel 160 is coincident with the axis of the adjustment shaft 104.

Spaced radially from the wheel 160 on diametrically opposite sides of the wheel 160 are annular abutment walls 161 and 162. The axis of the annular abutment walls 161 and 162 are coincident with the axis of the drive shaft 94 of the motor 82. The annular abutment walls 161 and 162 are movable only in their axial direction and are interconnected to form a suitable cage 165. Depending from the cage 165 is fixed relation is a suitable carrier 170 that rides along rails 171 and 172. The rails 171 and 172 are formed by a bracket 175 secured to the housing of the motor 82. The cage 165 moves in unison in the axial direction thereof.

The adjustment shaft 104 and the wheel 160 rotate in unison about the axis of the drive shaft 94. When neither wall 161 nor the wall 160 engages the wheel 160, the adjustment shaft 104 does not turn about its axis and the connector 106 remains in its adjusted position. Manually moving the carrier 170 along the rails 171 and 172 in one direction will cause the wall 161 to engage the wheel 160. As a consequence thereof, the wheel 160 will rotate in one direction to rotate the adjustment shaft 104 therewith about their axes to alter the position of the connector 106 in one direction along the axis of the adjustment shaft 104. Manually moving the carrier 170 along the rails 171 and 172 in an opposite direction will cause the wall 162 to engage the wheel 160. This action results in the wheel 160 turning in an opposite direction to rotate the adjustment shaft 104 therewith in an opposite direction about their axes to change the position of the connector in an opposite direction along the axis of the adjustment shaft 104. The portions of the walls of the abutment walls 161 and 162 engageable with the wheel 160 are, in the preferred embodiment, formed with an abrasive surface to improve the turning action of the wheel 160 about its axis when engaged either by the wall 161 or the wall 162.

Movement of the cage 165 is accomplished by a flexible body 176 which is movable within a tube 177. The tube 177 is held in a fixed position by a collar 180 fixed to a bifurcated bracket 178. The proximal end of the flexible rod 176 is secured to an upstanding tab 182 of the carrier 170. A suitable knob, not shown, is fixed to the distal end of the flexible rod 176. Thus, movement of the flexible rod 176 within the tube 177 imparts movement to the cage 165 through the carrier 170.

Having thus described the invention, that which is claimed is:

1. A continuous welding machine having a mechanism for oscillating the welding head across the weld area, said machine including a slide connected to said welding head and a drive arm connected to said slide, the improvement comprising:
    (a) an adjustment shaft with an axis;
    (b) carrier means supporting said adjustment shaft for rotation about the axis of said adjustment shaft and against displacement in the axial direction of said adjustment shaft;
    (c) drive means connected to said carrier means for imparting rotation to said adjustment shaft about a drive axis;
    (d) rotatable means mounted on said adjustment shaft in fixed relation thereto and having an axis coincident with the axis of said adjustment shaft;
    (e) abutment means engaging said rotatable means to turn said adjustment shaft about its axis,
    (f) a connector carried by said adjustment shaft for rotation therewith about said drive axis and movable along the axis of said adjustment shaft in response to said adjustment shaft turning about its axis through the engagement of said abutment means with said rotatable means;
    (g) drive linkage means pivotally connected to said connector to be driven over an eccentric path in response to the rotation of said adjustment shaft about said drive axis, the displacement of said drive linkage means over its eccentric path being controlled by the location of said connector along the axis of said adjustment shaft; and
    (h) actuating means selectively operated for moving said abutment means into and out of engagement with said rotatable means.

2. A continuous welding machine as claimed in claim 1 wherein said adjustment shaft is a threaded shaft, and said connector is threaded for threaded engagement with said adjustment shaft.

3. A continuous welding machine as claimed in claim 2 wherein said drive axis is perpendicular to the axis of said adjustment shaft.

4. A continuous welding machine as claimed in claim 3 wherein said rotatable means is a cylindrical body with radial projections and said abutment means being movable between a position engaging a projection of said cylindrical body and a position removed from engagement with a projection of said cylindrical body.

5. A continuous welding machine as claimed in claim 4 wherein said abutment means comprises a plurality of spaced apart projection engaging pins, said cylindrical body being disposed between said pins, and wherein said actuating means being electrically operated for moving selectively said projection engaging pins, respectively, into and out of engagement with a projection of said cylindrical body for turning said adjustment shaft about its axis and for controlling the direction in which said cylindrical body turns said adjustment shaft about its axis.

6. A continuous welding machine as claimed in claim 5 wherein said actuating means includes a plurality of solenoids for selectively moving said projection engaging pins into and out of engagement with a projection of said cylindrical body.

7. A continuous welding machine as claimed in claim 3 wherein said rotatable means is a cylindrical body and said abutment means comprises a first annular wall spaced radially from said cylindrical body along its path of travel about said drive axis, said first annular wall being movable radially relative to said cylindrical body between a position engaging said cylindrical body and a position removed from engagement with said cylindrical body.

8. A continuous welding machine as claimed in claim 7 wherein said abutment means comprises a second annular wall spaced radially from said cylindrical body along its path of travel about said drive axis, said cylindrical body being disposed between said first and second annular walls, said second annular wall being movable radially relative to said cylindrical body between a position engaging said cylindrical body and a position removed from engagement with said cylindrical body.

9. A continuous welding machine as claimed in claim 8 wherein said actuating means is electrically operated and is conected to said first and second walls for moving selectively said first and second walls, respectively, into and out of engagement with said cylindrical body for controlling the direction in which said cylindrical body turns said adjustment shaft about its axis.

* * * * *